US008173942B2

(12) United States Patent
Wiseman et al.

(10) Patent No.: US 8,173,942 B2
(45) Date of Patent: May 8, 2012

(54) SELF-CLEANING OVER THE RANGE OVEN

(75) Inventors: Joshua Stephen Wiseman, Elizabethtown, KY (US); Christopher E. O'Malley, Louisville, KY (US); Stephen Bernard Froelicher, Shepherdsville, KY (US); Charles Ray Smith, Simpsonville, KY (US); Karen Marie Edberg, Louisville, KY (US); Jay Andrew Broniak, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/263,268

(22) Filed: Oct. 31, 2005

(65) Prior Publication Data

US 2007/0095822 A1 May 3, 2007

(51) Int. Cl.
*H05B 6/64* (2006.01)
*A21B 1/26* (2006.01)

(52) U.S. Cl. ......... 219/685; 219/757; 219/400; 126/198

(58) Field of Classification Search .................. 219/685, 219/396, 705, 707, 710, 738, 400, 391, 740, 219/719, 741, 757, 759; 126/21 A, 273 A, 126/273 R, 193, 200, 299 F, 21 R; 426/233, 426/243
See application file for complete search history.

(56) References Cited

U.S. PATENT DOCUMENTS

| | | | | |
|---|---|---|---|---|
| 3,550,580 A | | 12/1970 | Wong | |
| 3,736,916 A | | 6/1973 | White | |
| 3,783,219 A | * | 1/1974 | Tateda | 219/757 |
| 3,812,316 A | | 5/1974 | Milburn | |
| 3,893,442 A | | 7/1975 | Nuss | |
| 4,013,861 A | * | 3/1977 | Westfall | 219/741 |
| 4,114,013 A | * | 9/1978 | Simon et al. | 219/738 |
| 4,191,875 A | | 3/1980 | Cunningham | |
| 4,206,338 A | | 6/1980 | Kato | |
| 4,303,818 A | | 12/1981 | Smith | |
| 4,320,275 A | | 3/1982 | Reiss | |
| 4,358,653 A | | 11/1982 | Weiss | |
| 4,369,347 A | * | 1/1983 | Shin | 219/757 |
| 4,390,767 A | | 6/1983 | Bucksbaum et al. | |
| 4,410,779 A | | 10/1983 | Weiss | |
| 4,547,642 A | | 10/1985 | Smith | |
| 4,555,606 A | | 11/1985 | Thomas et al. | |
| 4,556,771 A | | 12/1985 | Thomas | |
| 4,601,279 A | | 7/1986 | Guerin | |
| 4,623,781 A | | 11/1986 | Thomas | |
| 4,640,265 A | | 2/1987 | Romo | |

(Continued)

FOREIGN PATENT DOCUMENTS

KR 2003031314 A * 4/2003

*Primary Examiner* — Quang Van

(74) *Attorney, Agent, or Firm* — Global Patent Operation; Douglas D. Zhang

(57) ABSTRACT

An over the range oven includes a main body defining a cooking cavity therein, wherein the cooking cavity includes a front edge surrounding an opening. An RF generation module is coupled to the cooking cavity and is configured to deliver microwave energy into the cooking cavity. At least one radiant heat source is coupled to the cooking cavity and is configured to supply heat energy to the cooking cavity. The oven is configured to operate in a radiant heat mode of operation, a microwave mode of operation, a dual mode of operation, and a self clean mode of operation.

22 Claims, 9 Drawing Sheets

U.S. PATENT DOCUMENTS

| | | | | | |
|---|---|---|---|---|---|
| 4,752,664 | A | | 6/1988 | Yose | |
| 4,857,685 | A | | 8/1989 | Vigano et al. | |
| 4,886,046 | A | | 12/1989 | Welch | |
| 5,042,458 | A | | 8/1991 | Spencer et al. | |
| 5,085,204 | A | | 2/1992 | Moyer | |
| 5,140,120 | A | | 8/1992 | Kasai et al. | |
| 5,204,503 | A | * | 4/1993 | Maiellano et al. | 219/681 |
| 5,365,833 | A | | 11/1994 | Chen | |
| 5,441,036 | A | | 8/1995 | Mikalauskas, II et al. | |
| 5,588,421 | A | * | 12/1996 | Busch et al. | 126/200 |
| 5,674,425 | A | | 10/1997 | Hong | |
| 5,814,794 | A | | 9/1998 | Lim | |
| 5,918,589 | A | | 7/1999 | Valle et al. | |
| 5,928,540 | A | | 7/1999 | Antoine et al. | |
| 6,376,817 | B1 | * | 4/2002 | McFadden et al. | 219/681 |
| 6,670,761 | B1 | | 12/2003 | Lee et al. | |
| 6,723,961 | B2 | * | 4/2004 | Choat et al. | 219/400 |
| 6,730,879 | B1 | | 5/2004 | Muegge et al. | |
| 6,730,881 | B1 | | 5/2004 | Arntz et al. | |
| 6,815,644 | B1 | | 11/2004 | Muegge et al. | |
| 2003/0146201 | A1 | | 8/2003 | Smith et al. | |
| 2004/0178192 | A1 | | 9/2004 | Muegge et al. | |
| 2004/0245246 | A1 | | 12/2004 | Bakanowski et al. | |

* cited by examiner

SELF-CLEANING OVER THE RANGE OVEN

BACKGROUND OF THE INVENTION

This invention relates generally to ovens, and more particularly, to self-cleaning ovens over-the-range.

Generally, an oven is an appliance which cooks food using a heat source. Some conventional ovens operate as secondary ovens and are wall-mounted as an over-the-range microwave oven. The over-the-range ovens are typically installed above a cooking appliance, such as a gas oven range in a kitchen space. At least some known over-the range ovens include a radiant heat cooking source. The radiant heat cooking source operates to heat a cooking cavity of the over-the-range oven, thus heating and cooking the food contained therein. At least some other known over-the-range ovens also include a radio-frequency generation module, such as a magnetron, for supplying additional cooking capacity to the cooking cavity. During the cooking process, the magnetron generates high-frequency electromagnetic waves. The microwaves penetrate food so as to repeatedly change the molecular arrangement of moisture laden in the food, thus causing the molecules of moisture to vibrate and generate a frictional heat within the food to cook the food. These known over-the-range ovens, typically utilize the magnetron in a speed cooking or microwave assist mode of operation.

During the cooking process, substances cooked inside the microwave oven may generate materials, such as grease, which over time may become undesirably deposited on the walls of the cooking cavity, the cooking rack and/or the heat source itself. However, cleaning the cooking cavity after frequent usage can be problematic.

For example, within such known over-the-range ovens, the cooking cavity is typically cleaned by hand. Cleaning the cavity may be a time consuming task, and may result in damage to the coatings on the cooking cavity.

BRIEF DESCRIPTION OF THE INVENTION

In one aspect, an over the range oven is provided including a main body defining a cooking cavity therein, wherein the cooking cavity includes a front edge surrounding an opening. An RF generation module is coupled to the cooking cavity and is configured to deliver microwave energy into the cooking cavity. At least one radiant heat source is coupled to the cooking cavity and is configured to supply heat energy to the cooking cavity. The oven is configured to operate in a radiant heat mode of operation, a microwave mode of operation, a dual mode of operation, and a self clean mode of operation.

In another aspect, a method of assembling an over the range oven is provided, wherein the method includes providing a main body defining a cooking cavity therein, and coupling an RF generation module to the cooking cavity, wherein the RF generation module is configured to deliver microwave energy into the cooking cavity. The method also includes coupling a radiant heat source within the cooking cavity, wherein the radiant heat source is configured to supply heat energy to the cooking cavity. The method also includes operatively coupling a controller to the RF generation module and the radiant heat source, wherein the controller is configured to operate the RF generation module and the radiant heat source in a radiant heat mode of operation, a microwave mode of operation, a dual mode of operation, and a self clean mode of operation.

DETAILED DESCRIPTION OF THE INVENTION

Figure 1:
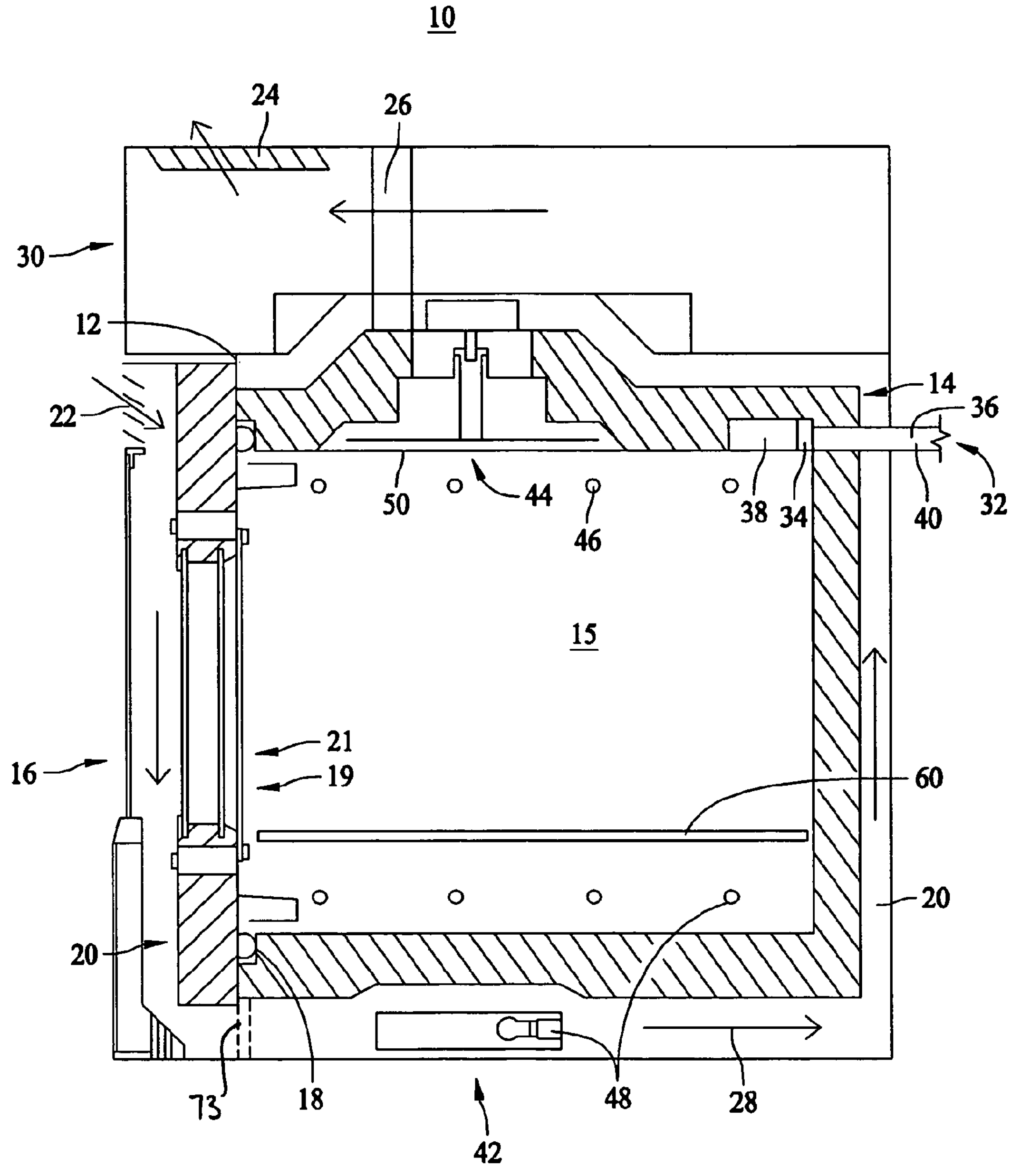
FIG. 1 is a cross-sectional view of an exemplary over-the-range oven.

FIG. 1 is a cross-sectional view of an exemplary over the range oven 10. Oven 10 includes a front frame 12 surrounding a main body 14. Main body 14 defines a cooking cavity 15 therein. While oven 10 is described as an over the range oven that is mounted over a primary range, the invention is not intended to be limited to an over the range oven, and may include other oven types, such as, for example, a built-in or wall mounted oven. Each of the walls of main body 14 are fabricated from a metal material having an inner porcelain coating thereon and an insulation backing for resisting a high temperature in a self-cleaning process. For example, main body 14 includes sidewalls, a top wall and a bottom wall defining cooking cavity 15. Cooking cavity 15 includes a front edge 18 surrounding an opening 19. Front frame 12 extends along front edge 18 and includes a front frame opening 21 corresponding to opening 19. A door 16 is provided at front edge 18 for accessing cooking cavity 15.

Main body 14 includes a cooling air flow channel 20, also referred to herein as a cooling cavity, surrounding cooking cavity 15. Channel 20 includes a cooling air inlet 22 and a cooling air outlet 24 in flow communication with air flow channel 20. In an exemplary embodiment, inlet 22 is included within door 16. Air flow channel 20 extends through door 16, such that door 16 is cooled by the air flow. Additionally, cooling air flow is directed through channel 20 in main body 14 around cooking cavity 15. As such, the walls of main body 14 are cooled by the air flow. In one embodiment, the cooling airflow is directed across the heating sources of over-the range oven 10, as will be discussed in detail below. The cooling airflow is then exhausted through outlet 24. A cooling fan 26 is positioned in cooling air flow channel 20 for directing cooling air flow through channel 20. One exemplary cooling air flow path is designated by reference numeral 28. Alternatively, the air flow path is directed in a direction opposite the direction shown by flow path 28. A hood structure 30 is provided along an upper portion of the over-the-range oven 10, such as proximate the top wall of main body 14. Hood structure 30 includes fan 26 and outlet 22. Hood structure 30 is in flow communication with channel 20 such that air flow from channel 20 is directed into hood structure 30 and then exhausted from over-the-range oven 10.

Oven 10 includes a venting system 32 coupled in flow communication with cooking cavity 15. Venting system 32 includes a vent fan 34 coupled to an exhaust duct 36. Exhaust duct 36 includes an inlet 38 positioned along a top wall of main body 14. Alternatively, exhaust duct 36 is positioned along a side wall. Exhaust duct 36 also includes an outlet 40 positioned on an exterior of main body 14. Exhaust duct 36 extends through main body 14. In operation, venting system 32 channels air from within cooking cavity 15 to an exterior of oven 10, such as to an exterior portion of the home or building. Alternatively, venting system 32 exhausts air from a front portion of oven 10 into the kitchen.

Over-the-range oven 10 includes a plurality of cooking or heating sources 42. In the exemplary embodiment, over-the-range oven 10 includes a RF generation system 44 (e.g., a magnetron), an upper heater module 46, and a lower heater module 48. Upper and/or lower heater modules 46 and/or 48 include radiant heating elements, such as, for example, a ceramic heater or a halogen cooking lamp. Upper and/or lower heater modules 46 and/or 48 includes at least one of a sheath heater, a conventional bake element, a broil element, or a convection heating element. A convection fan (not shown) may be provided for blowing air over heating elements and into cooking cavity 15. RF generation system 44 may be referred to hereinafter as a microwave element, and heater modules 46 and 48 may be referred to hereinafter as bake elements or broil elements.

Specific heating modules 46 and 48 and RF generation system 44 can vary from embodiment to embodiment, and the elements and system described above are exemplary only. For example, upper heater module 46 can include any combination of heaters including combinations of halogen lamps, ceramic lamps, and/or sheath heaters. Similarly, lower heater module 48 can include any combination of heaters including combinations of halogen lamps, ceramic lamps, and/or sheath heaters. In addition, the heaters can all be one type of heater. The specific ratings and number of lamps and/or heaters utilized in upper heater module and lower heater module can vary from embodiment to embodiment. Generally, the combinations of lamps, heaters, and RF generation system is selected to provide the desired cooking characteristics for speedcooking, microwave only, microwave assist, convection/bake and self clean modes of operation. Additionally, the combinations of lamps, heaters, and RF generation system are configured to operate together at a predetermined power level. For example, in one embodiment, combinations of lamps, heaters, and RF generation system are configured to operate on a 15 Amp, 120 Volt circuit.

In the exemplary embodiment, oven 10 includes a waveguide member 50 surrounding RF generation system 44. Waveguide member 50 is fabricated from a material that is electrically conductive such that waveguide member 50 facilitates favorable transport of microwaves into cooking cavity 15. Additionally, waveguide member 50 is fabricated from a material that is non-thermally conductive, or that has a thermal conductivity such that magnetron 44 is not heated beyond its thermal limit during use and/or during self-clean. As such, while the material selected for waveguide member 50 may be less electrically conductive and may have microwave power loss as compared to other materials that are more thermally conductive, waveguide member 50 protects magnetron 44 in a self clean cycle. In one embodiment, waveguide member 50 is fabricated from a stainless steel material that is approximately thirty percent as conductive as a mild steel material to facilitate protecting magnetron 44. In one embodiment, wave guide member 50 includes a plurality of thermal breaks, such as openings along the outer surface of wave guide member 50 to facilitate reducing the thermal conductivity of wave guide member 50.

A cooking rack 60 is positioned in cooking cavity 15 for supporting food thereon, and is positioned between upper and lower heater modules 46 and 48. Cooking rack 60 is configured to withstand a self clean oven temperature, and is described in more detail with reference to FIGS. 7 and 8.

In the exemplary embodiment, oven 10 includes a plurality of thermal break slots 70 in front frame 12 and a plurality of thermal break slots 72 through an inner face 73 of door 16. Slots 70 and 72 provide a barrier to heat transfer in frame 12 and door 16, respectively. As such, slots 70 and 72 facilitate providing an energy savings for heating sources 42. In the exemplary embodiment, slots 72 in door 16 are substantially aligned with slots 70 in front edge 18.

Figure 2:
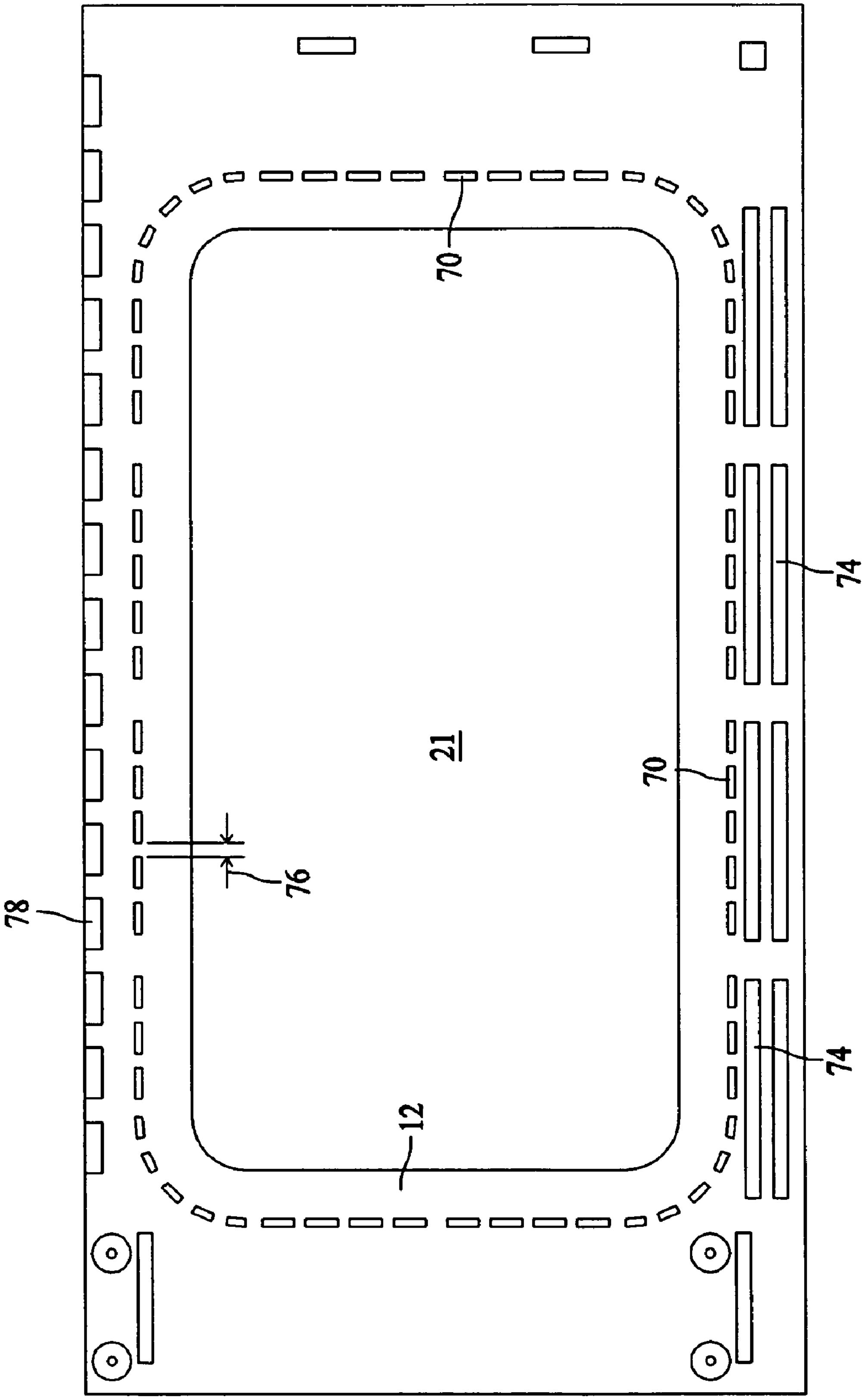
FIG. 2 is a front elevational view of an exemplary frame for the over-the-range oven shown in FIG. 1.

FIG. 2 is a front elevational view of frame 12 illustrating slots 70 distributed about a periphery of opening 21. FIG. 2 also illustrates openings 74 through front frame 12 that open into air flow channels 20 (shown in FIG. 1).

Thermal break slots 70 extend through front frame 12 and reduce thermal transfer through front frame 12. In the exemplary embodiment, slots 70 surround front frame opening 21 and are positioned a distance from opening 21. Slots 70 are spaced apart from one another by a distance 76 which is selected to provide structural integrity to front frame 12 while reducing thermal transfer through front frame 12. For example, when oven 10 is operated, heat is transferred from cooking cavity 15 (shown in FIG. 1) to front frame 12 at opening 21. The heat is then transferred radially outward from opening 21 through front frame 12. Thermal break slots 70 operate as insulators and resist thermal transfer. As such, the heat is transferred through the portion of frame 12 between each slot 70. By reducing the amount of material between each slot 70, the amount of heat transferred through front frame 12 is also reduced.

Air flow channel openings 74 extend through front frame 12 adjacent a lower edge of front frame 12. Openings 74 are sized to allow a predetermined amount of airflow into air flow channels 20. In the exemplary embodiment, a plurality of openings 74 allow airflow into a single channel 20. Alternatively, each opening 74 extends into a separate and discrete air flow channel 20 for cooling a predetermined portion or component of oven 10.

In the exemplary embodiment, front frame 12 includes airflow slots 78 proximate an upper edge of front frame 12. Air from channels 20 flow through airflow slots 78 toward door 16 (shown in FIG. 1).

Figure 3:
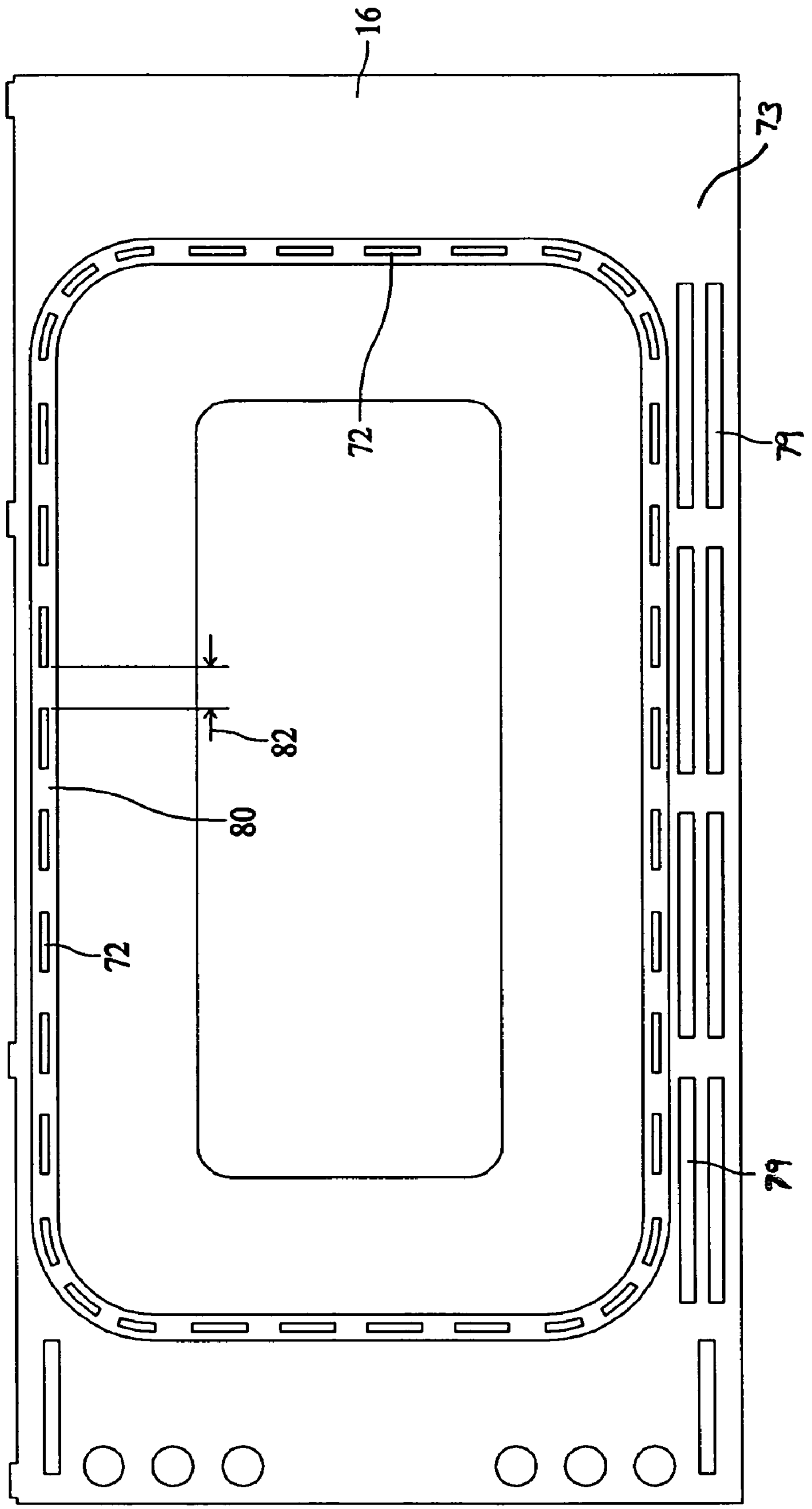
FIG. 3 is a front elevational view of an exemplary door for the over-the-range oven shown in FIG. 1.

FIG. 3 is a front elevational view of door 16 illustrating openings 79 through inner face 73 of door 16 which are in communication with air flow channels 20. FIG. 3 also illustrates slots 72. Air flow channels 20 extend through door 16 adjacent a lower edge of door 16. Channels 20 are sized to allow a predetermined amount of airflow therethrough. In the exemplary embodiment, a plurality of channels 20 are in flow communication with one another. Alternatively, each channel 20 is separate and discrete from each other channel 20.

Thermal break slots 72 extend through a portion of door 16 and reduce thermal transfer through door 16. In the exemplary embodiment, slots 72 are positioned within a gasket trough 80 recessed from the surface of door 16. Slots 72 are spaced apart from one another by a distance 82. Distance 82 is selected to provide structural integrity to door 16 while reducing thermal transfer through door 16. For example, when oven 10 is operated, heat is transferred from cooking cavity 15 (shown in FIG. 1) to door 16 at opening 19. The heat is then transferred radially outward through door 16. Thermal break slots 72 operate as insulators and resist thermal transfer. As such, the heat is transferred through the portion of door 16 between each slot 72. By reducing the amount of material between each slot 72, the amount of heat transferred through door 16 is also reduced.

Figure 4:
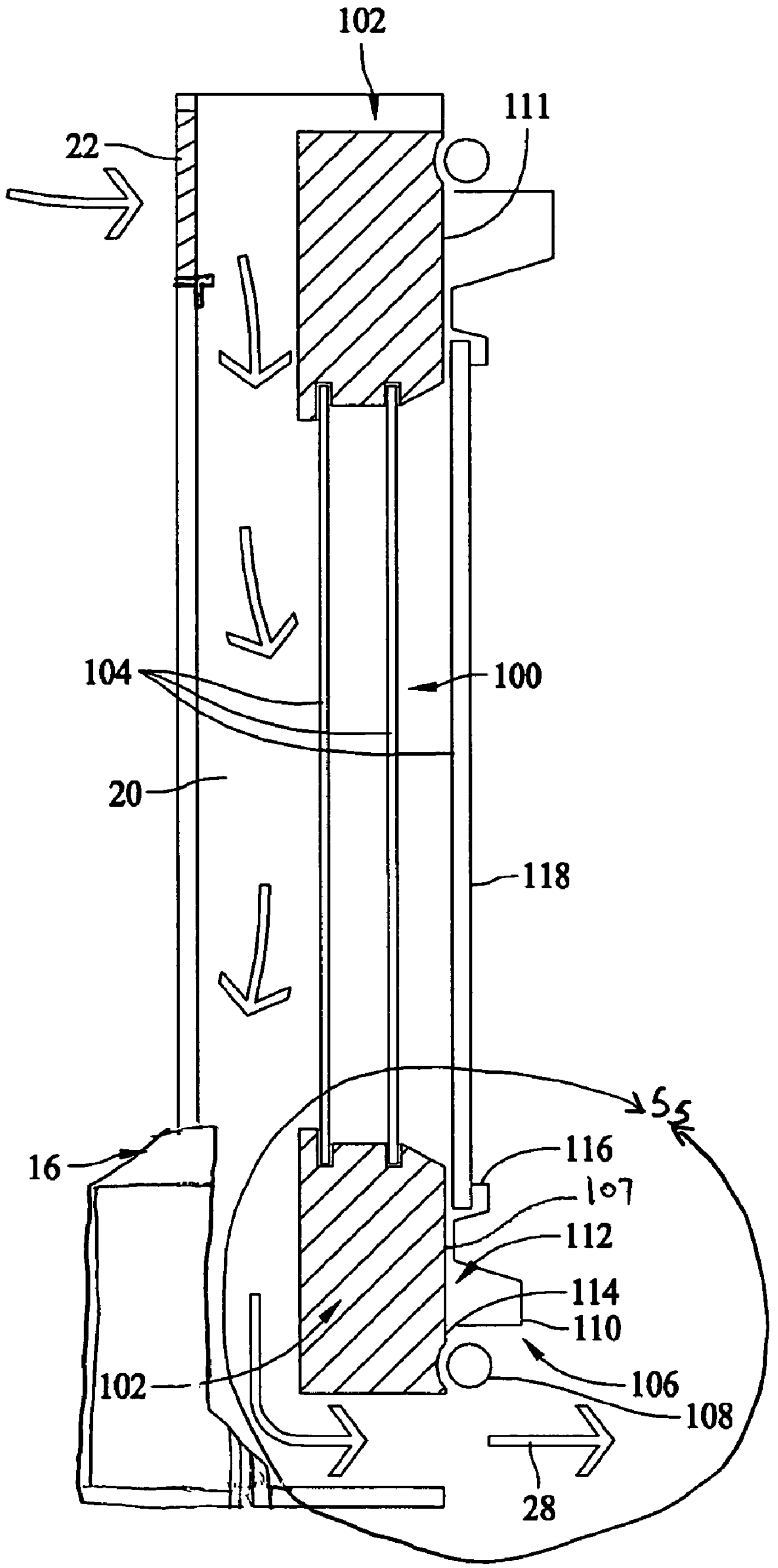
FIG. 4 is a cross-sectional view of the door shown in FIG. 3.
Figure 5:
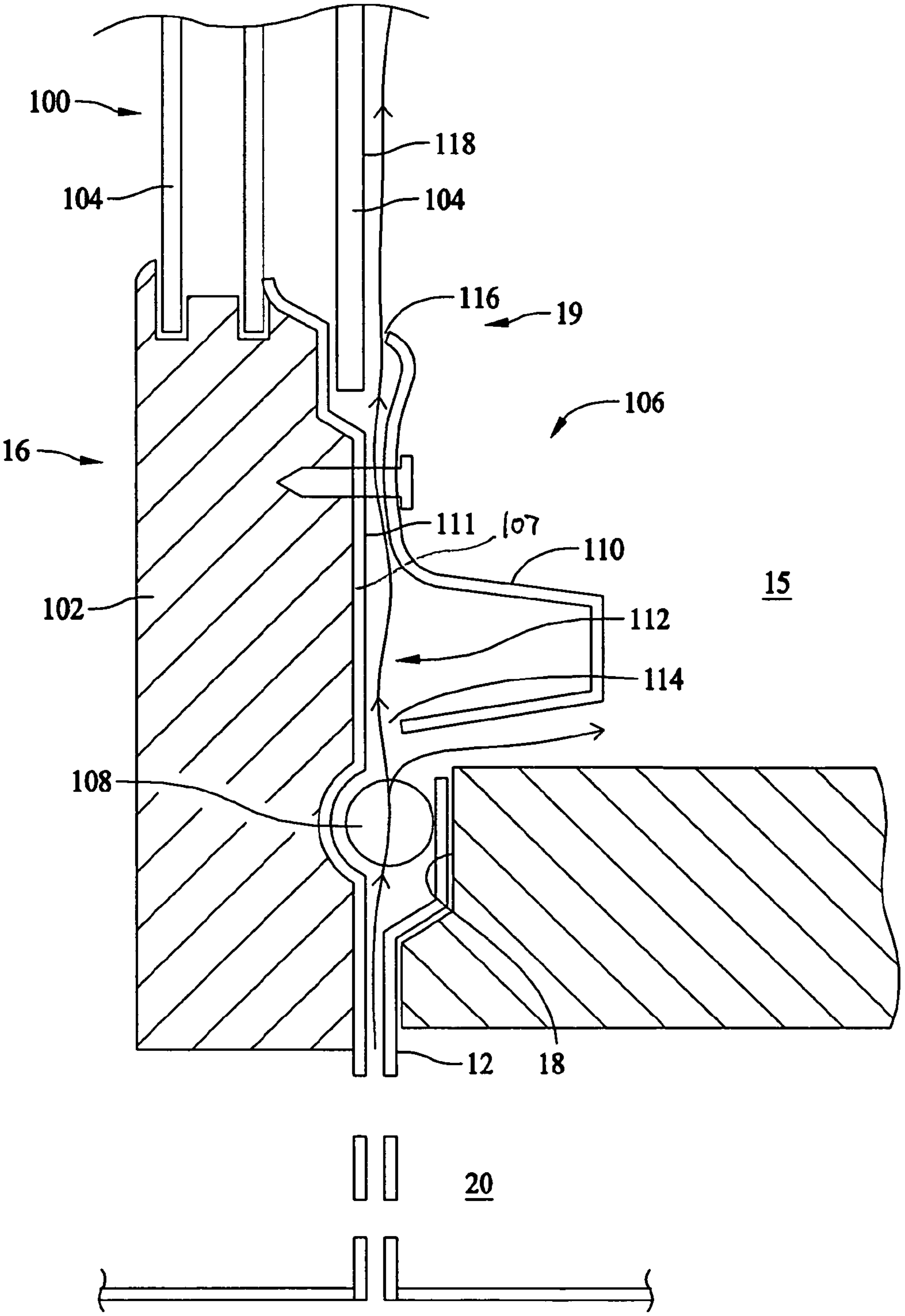
FIG. 5 is an enlarged view of a portion of the door shown in FIG. 4 and taken along area 5.

FIG. 4 is a cross-sectional view of door 16 having a window pack 100. FIG. 5 is an enlarged view of a portion of door 16 and taken along area 5. Door 16 includes a door frame 102 surrounding window pack 100 which includes a plurality of glass panes 104 spaced apart from each other and arranged substantially in parallel with one another. In the exemplary embodiment, window pack 100 includes four glass panes 104. An air space is created between each glass pane 104, which provides thermal efficiency for oven 10. Air flow channel 20 extends through door 16 for cooling door 16, and more particularly window pack 100.

An inner door assembly 106 is provided between door 16 and front edge 18 of main body 14. Inner door assembly 106 includes a door liner 107 along an inner portion of door 16, a gasket 108 attached to door liner 107, and a microwave choke 110 attached to door liner 107 along an inner surface 111 thereof. Inner surface 111 of door frame 102 has a porcelain coating, which facilitates door 16 withstanding the high temperature in the self-cleaning process. Choke 110 extends along door frame 102 and a portion of choke 110 supports window pack 100. Gasket 108 surrounds choke 110. When door 16 closes opening 19, gasket 108 is sandwiched between inner surface 111 of door frame 102 and front frame 12, along front edge 18 of cooking cavity 15. Choke 110 is positioned adjacent to front edge 18 to prevent microwave leakage. In the exemplary embodiment, slots 72 (shown in FIG. 3) are substantially aligned with gasket 108 of inner door assembly 106.

As illustrated in FIG. 5, an air flow channel 112 is defined between choke 110 and door frame 102, and further includes an air inlet 114 adjacent to gasket 108 and an air outlet 116 adjacent to window pack 100. Inlet 114 is in flow communication with cooling air flow channel 20. Outlet 116 is defined between choke 110 and an inner surface 118 of window pack 100, to facilitate air flow between choke 110 and frame 102 and to facilitate air flow along inner surface 118 of window pack 100. The air flow along inner surface 118 of window pack 100 facilitates reducing or eliminating steam buildup on inner surface 118, particularly in the microwave mode of operation. In the exemplary embodiment, venting system 32 (shown in FIG. 1) is operated to create a negative pressure within cooking cavity 15 which facilitates pulling air flow through choke 110 and along inner surface 118 of window pack 100.

With reference to FIGS. 1-5, during the self-cleaning process of microwave oven 10, heating sources 42 are energized to heat cooking cavity 15 to a self clean oven temperature, such as a temperature of approximately 850 degrees Fahrenheit. The self clean oven temperature is maintained for a predetermined time period, such as, for example, 2-4 hours, to clean cooking cavity 15. To operate oven 10 on a 15 Amp, 120 Volt circuit, and to maintain the self clean oven temperature, the walls of main body 14 are made of sheet metal having an inner porcelain coating and surrounded by an insulative material. Main body 14 includes slots 70 to resist thermal loss through the walls of main body 14. Additionally, window pack 100 includes multi-glass panes 104 and microwave choke 106 is provided having an airflow path along inner surface 111 of door 16. Moreover, gasket 108 is provided to seal cooking cavity 15 and reduce heat transfer from cooking cavity 15. As such, the temperature is maintained within cooking cavity 15 such that oven 10 may operate on a 15 Amp, 120 Volt circuit. To withstand self clean temperatures, the walls of main body 14 and door 16 have porcelain coatings and waveguide member 50 is fabricated from a material selected to protect magnetron 44 from the high self clean temperatures, which in the exemplary embodiment is stainless steel. Fan 26 is de-energized in the self-cleaning process to reduce heat dissipation around cavity 15.

Figure 6:
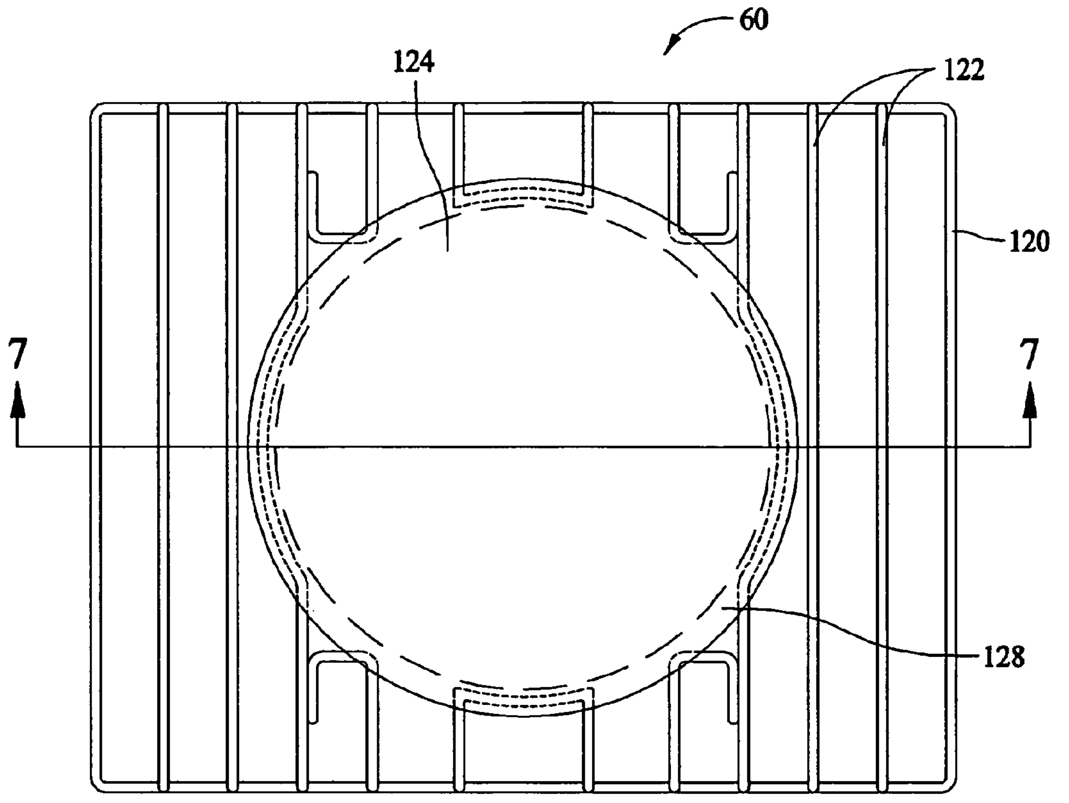
FIG. 6 is a top plan view of an exemplary cooking rack of the over-the-range oven shown in FIG. 1.
Figure 7:
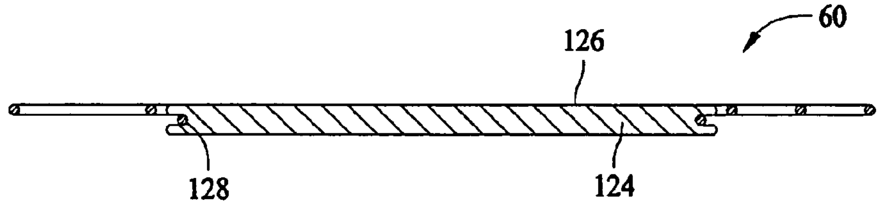
FIG. 7 is a cross-sectional view of the cooking rack shown in FIG. 7 along line 8-8.

FIG. 6 is a top plan view of cooking rack 60 and FIG. 7 is a cross-sectional view of rack 60 taken along line 7-7 shown in FIG. 6. Rack 60 includes a frame 120 supporting a plurality of bars 122 thereon, and a flat disc 124 having an upper flat surface 126. Disc 124 is made of a microwave transparent material that can withstand a self-cleaning temperature. Disc 124 includes a ring-shaped groove 128 defined on a circumferential surface thereof. Disc 124 is surrounded and engaged with some of bars 122, and a portion of bars 122 engage groove 128 to support disc 124. In the exemplary embodiment, disc 124 is made of ceramic material. Disc 124 provides a flat surface on rack 60, such that small items are stably supported on rack 60.

Figure 8:
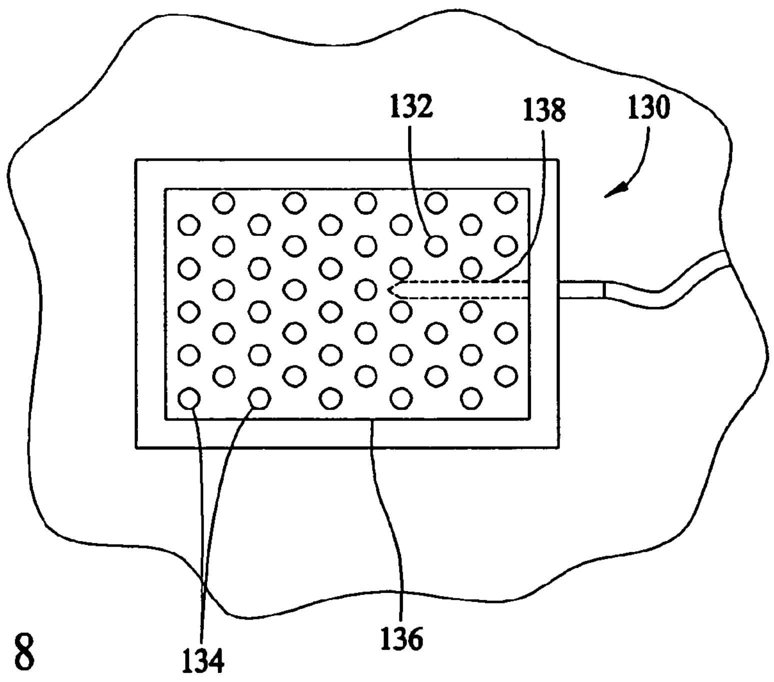
FIG. 8 is a bottom view of an exemplary detector housing viewed from inside of the over-the-range oven shown in FIG. 1.

FIG. 8 is a bottom view of a detector housing 130 viewed up from inside of over-the-range oven 10 (shown in FIG. 1). Detector housing 130 defines an inner space 132 therein, and detector housing 130 is positioned outside cooking cavity 15. In the exemplary embodiment, detector housing 130 is made of metal, and is welded to the top wall of main body 14. Detector housing 130 includes a plurality of holes 134 defined through a bottom wall 136 of detector housing 130, to enable inner space 132 to have air flow communication with cooking cavity 15. Holes 134 are sized such that microwaves generated by RF generation system 44 are restricted from passage therethrough. As such, detector housing 130 blocks microwaves from entering inner space 132 such that an accurate temperature measurement is detected within housing 130. A temperature detector 138, such as, for example a metal jacketed thermistor, is positioned in inner space 132. Temperature detector 138 is isolated from microwaves by bottom wall 136. Inner space 132 is vented to allow airflow from cooking cavity 15 to circulate around temperature detector 138, such that temperature detector 138 precisely detects the air temperature of cooking cavity 15 without being effected by microwaves.

Figure 9:
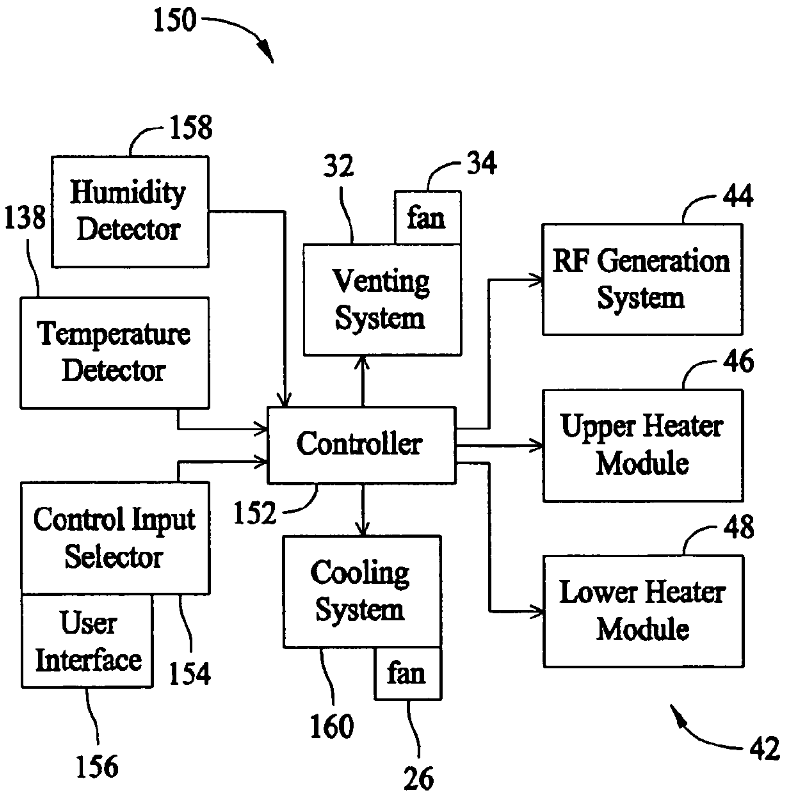
FIG. 9 is a schematic view of an exemplary control system of the over-the-range oven shown in FIG. 1.

FIG. 9 is a schematic view of an exemplary control system 150 of over-the-range oven 10 (shown in FIG. 1). Control system 150 includes a controller 152. Controller 152 receives inputs and operates various components of oven 10 based on the inputs. In the exemplary embodiment, controller 152 receives an input from a control input selector 154 that includes a user interface 156. A user selects items at user interface 156 relating to a cooking operation, such as a cooking temperature, a cooking mode, a cooking time, a type of food to be cooked, and the like. Controller 152 is configured to operate the components based on the inputs from the user. During operation of oven 10, controller 152 receives inputs from temperature detector 138 relating to the cooking temperature within cooking cavity 15 (shown in FIG. 1). Controller 152 is configured to operate the components based on the temperature in cooking cavity 15. In the exemplary embodiment, controller 152 also receives inputs from a humidity detector 158 relating to the humidity level within cooking cavity 15. Controller 152 is configured to operate the components based on the humidity level in cooking cavity 15. For example, during a microwave mode of operation, moisture is released into cooking cavity 15. The moisture may be removed by venting system 32.

In the exemplary embodiment, controller 152 is operatively coupled to RF generation system 44, upper heater module 46 and lower heater module 48. Controller 152 operates the various heating sources 42 based on the inputs. For example, heating sources 42 are operated based on the cooking mode selected by the user, such as speedcooking, microwave only, microwave assist, convection/bake and self clean modes of operation. Alternatively, or in addition thereto, controller 152 may operate the various heating sources 42 based on other inputs from control input selector 154, such as a cooking temperature or a cooking time, and the temperature or humidity level in cooking cavity 15.

Controller 152 controls fan 26 (shown in FIG. 1) based on the inputs. Controller 152 operates cooling system 160 based on the inputs. In the exemplary embodiment, cooling system 160 is operated based on the cooking mode selected by the user, such as speedcooking, microwave only, microwave assist, convection/bake and self clean modes of operation. Alternatively, or in addition thereto, controller 152 operates cooling system 160 based on other inputs from control input selector 154, such as a cooking temperature or a cooking time, and the temperature or humidity level in cooking cavity 15. During the cooking process, fan 26 is operated to channel air through cooling channel 20. The cooling air facilitates cooling door 16 and main body 14 (shown in FIG. 1). Thus, the external surface temperature of door 16 is maintained at a sufficiently cool level to avoid personal injury. Additionally, cooling system 160 facilitates providing airflow to cooking cavity 15. For example, when venting system 32 is operated, airflow is drawn into cooking cavity 15 from cooling channel 20.

Controller 152 is also operatively coupled to venting system 32 and vent fan 34. Controller 152 operates venting system 32 based on the inputs. In the exemplary embodiment, venting system 32 is operated based on the cooking mode selected by the user, such as speedcooking, microwave only, microwave assist, convection/bake and self clean modes of operation. In the exemplary embodiment, venting system 32 operates when RF generation module 44 is operated, but is inactive when RF generation module 44 is inactive. Alternatively, or in addition thereto, controller 152 operates venting system 32 based on other inputs from control input selector 154, such as a cooking temperature or a cooking time and the temperature or humidity level in cooking cavity 15. During the cooking process, vent fan 34 is operated to draw air from cooking cavity 15 and exhaust the air outside of oven 10. In the exemplary embodiment, venting system 32 is operated to draw air from cooling channel 20 through choke 110 and across inner surface 111 of window pack 100 door 16 (shown in FIG. 4). As such, moisture may be removed from window pack 100 for viewing the food within cooking cavity 15.

Figure 10:
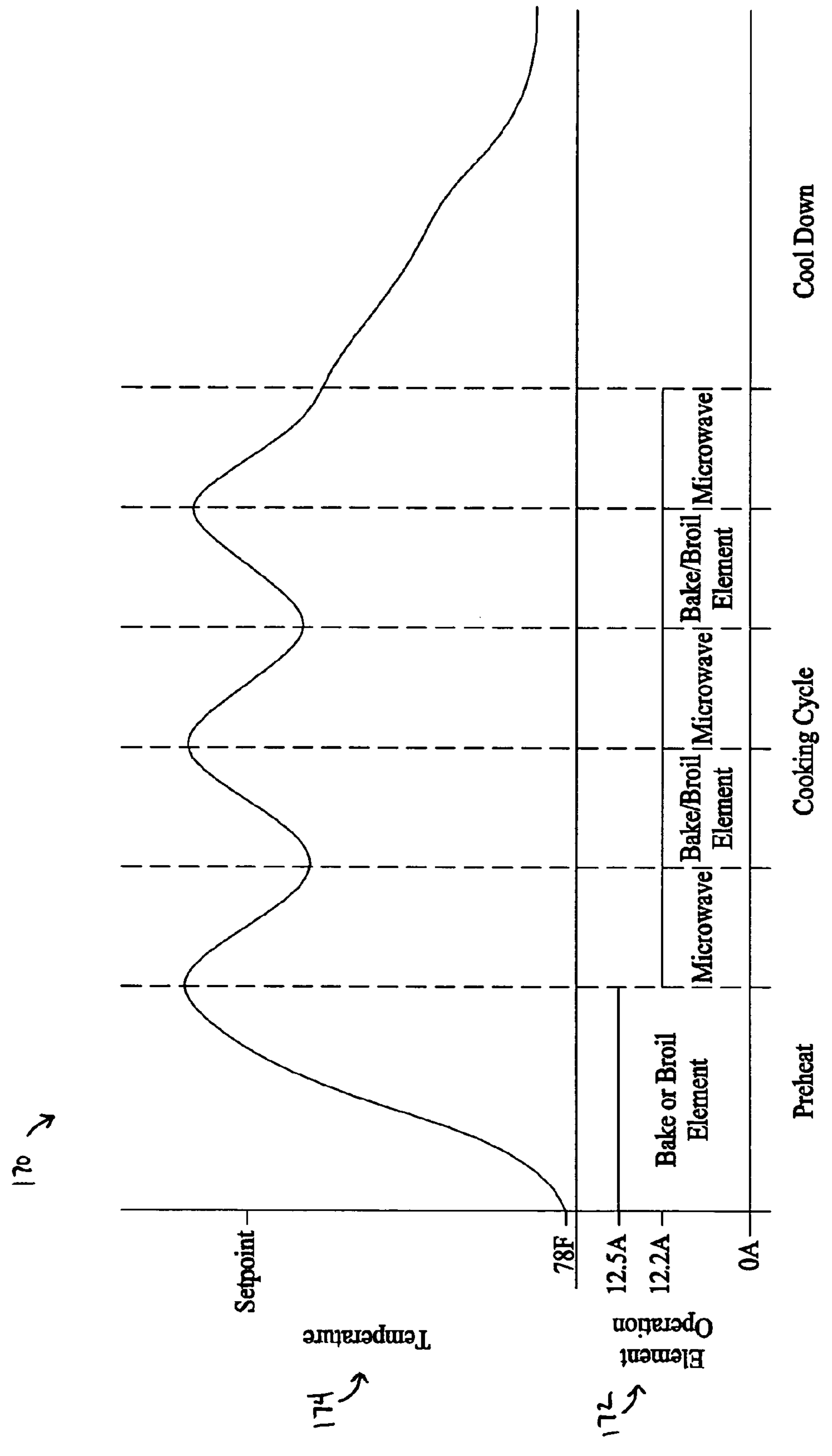
FIG. 10 is an operating diagram of the over-the-range oven shown in FIG. 1.

FIG. 10 is an operating diagram 170 of over-the-range oven 10. Diagram 170 charts the element operation-versus-time 172 in accordance with one operation scheme of over the range oven 10. Additionally, an exemplary temperature-versus-time 174 chart is diagramed relating to the element operation-versus-time chart.

In the exemplary embodiment, bake or broil elements 46 and/or 48 are operated during a preheat mode of operation. Bake or broil elements 46 and/or 48 operate at below 15 Amps, and in the exemplary embodiment, operate at approximately 12.5 Amps. Bake or broil elements 46 and/or 48 operate to increase the overall temperature in oven 10 to a temperature at or near a set-point or cooking temperature. The cooking temperature may be selected by a user depending on the particular type of food being cooked. To limit or reduce the overall power demand of oven 10, microwave element 44 is not operated while bake or broil elements 46 and/or 48 are operated. As such, oven 10 is operated at a power output below a power limit, such as, for example, 15 Amps.

During a cooking operation, microwave 44 and bake or broil elements 46 and/or 48 are operated according to a load sharing process. The load sharing process allows for speed cooking or microwave assist cooking with oven 10 rated at a power output below the power limit, such as, for example, 15 Amps. When oven 10 is at or near the temperature set-point, bake or broil elements 46 and/or 48 are turned off. During the time when bake or broil elements 46 and/or 48 are turned off, microwave 44 may operate depending on the mode of operation of oven 10. However, when the temperature of oven 10 falls to a minimum operating temperature or threshold, bake or broil elements 46 and/or 48 are operated to raise the temperature of oven 10. When bake or broil elements 46 and/or 48 are operated, microwave 44 is turned off. As such, the power output of oven 10 remains below the power limit, such as, for example, 15 Amps. Moreover, when the cooking operation is finished, both microwave 44 and bake or broil elements 46 and/or 48 are turned off, and oven is in a cool down cycle.

Figure 11:
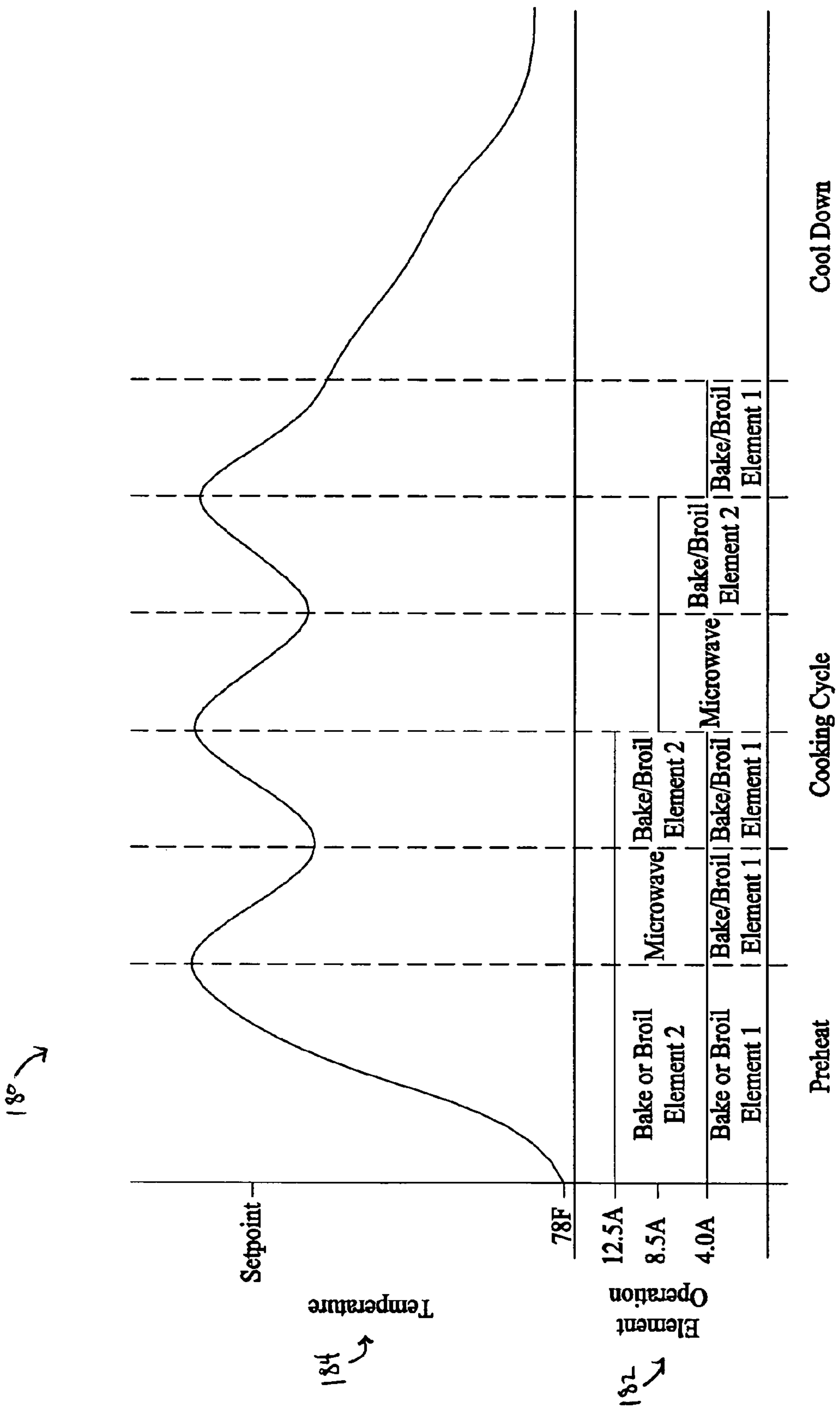
FIG. 11 is another operating diagram of the over-the-range oven shown in FIG. 1.

FIG. 11 is an alternative operating diagram 180 of over-the-range oven 10. Diagram 180 charts the element operation-versus-time 182 in accordance with one operation scheme of over the range oven 10. Additionally, an exemplary temperature-versus-time 184 chart is diagramed relating to the element operation-versus-time chart.

In the exemplary embodiment, bake or broil elements 46 and/or 48 define a first element 186 and a second element 188. First element 186 includes bake or broil elements from one of upper heater module 46 or lower heater module 48. Additionally, second element 188 includes bake or broil elements from one of upper heater module 46 or lower heater module 48. In an alternative embodiment, first element 186 includes bake or broil elements from both upper heater module 46 and lower heater module 48. Additionally, second element 188 includes bake or broil elements from both upper heater module 46 and lower heater module 48. In another embodiment, first element 186 and second element 188 share heating elements selected from upper heater module 46 or lower heater module 48. In the exemplary embodiment, first element 186 and second element 188 are operated at different power outputs. For example, first element 186 operates at a power output of approximately 4.0 Amps and second element 188 operates at a power output of approximately 8.5 Amps. However, the power output of first and second elements 186 and 188 may be more or less than 4.0 and 8.5 Amps, respectively, depending on the particular application. In addition, the power output is selected to operate simultaneously below a predetermined power limit, such as, for example, 15 Amps.

In the exemplary embodiment, first and second elements 186 and 188 are operated during a preheat mode of operation. First and second elements 186 and 188 operate at below 15 Amps, and in the exemplary embodiment, operate at approximately 8.5 Amps. First and second elements 186 and 188 operate to increase the overall temperature in oven 10 to a temperature at or near a set-point or cooking temperature. The cooking temperature may be selected by a user depending on the particular type of food being cooked. To limit or reduce the overall power demand of oven 10, microwave element 44 is not operated while first and second elements 186 and 188 are operated. As such, oven 10 is operated at a power output below the power limit, such as, for example, 15 Amps.

During a cooking operation, microwave 44 and bake or broil elements 46 and/or 48 are operated according to a load sharing process. The load sharing process allows for speed cooking or microwave assist cooking with oven 10 rated at a power output below the power limit, such as, for example, 15 Amps. In one load sharing mode, second element 188 is turned off, first element 186 is operated, and microwave 44 is operated. As such, microwave 44 is used to assist in cooking the food, and the temperature of oven 10 is reduced more slowly as compared to a microwave 44 only mode of operation. However, when the temperature of oven 10 falls to a minimum operating temperature or threshold, second element 188 may be required to raise the temperature of oven 10. As such, oven 10 may be operated in another load sharing mode of the cooking cycle wherein both first and second elements 186 and 188 are operated, and microwave 44 is turned off. As such, the power output of oven 10 remains below the power limit, such as, for example, 15 Amps. In another mode of operation, both first and second elements 186 and 188 are turned off and microwave 44 is operated. In yet another mode of operation, first element 186 is turned off, second element 188 is turned on, and microwave 44 is turned off. This mode of operation may be used to increase the temperature within oven at a slower rate and at a reduced power as compared to other modes of operation. In a further mode of operation, first element 186 is operated, second element 188 is turned off, and microwave 44 is turned off. This mode of operation may be used to reduce the speed that the temperature decreases within oven, and may be used to operate oven 10 at a reduced power as compared to other modes of operation. Moreover, when the cooking operation is finished, both microwave 44 and bake or broil elements 46 and/or 48 are turned off, and oven is in a cool down cycle.

While the invention has been described in terms of various specific embodiments, those skilled in the art will recognize that the invention can be practiced with modification within the spirit and scope of the claims.

What is claimed is:

1. An over the range oven comprising:

a main body comprising a top wall, a bottom wall, a rear wall, and a pair of opposing sidewalls;

a frame surrounding the main body and defining a first air flow channel between the frame and main body;

the main body defining a cooking cavity, said cooking cavity further comprising a front edge surrounding an opening opposite said rear wall;

a radio frequency (RF) generation module configured to deliver microwave energy into said cooking cavity;

at least one radiant heat source in communication with said cooking cavity and configured to supply heat energy to said cooking cavity;

a door coupled to said main body, said door defining a second air flow channel in communication with said first air flow channel with said door in a closed position, said door having an inner surface in communication with said cooking cavity when said door is in the closed position, wherein said oven is configured to operate in a radiant heat mode of operation, a microwave mode of operation, a dual mode of operation, and a self clean mode of operation;

a choke assembly comprising a microwave choke coupled to said inner surface of said door and a gasket sealing a space between said door and a main body front edge when said door is in said closed position;

an air inlet and an air outlet of the microwave choke defining a third air flow channel configured to channel air through said microwave choke and direct the air from the air outlet along said inner surface of the door and into said cooking cavity; and a venting system positioned proximate said rear wall and between said cooking cavity and an exterior environment, said venting system configured to operate in an active mode when said RF generation module is activated and operate in a passive mode when said RF generation module is deactivated, in the active mode said venting system providing flow communication between said cooking cavity and said third airflow channel, said venting system further configured to exhaust air from said cooking cavity outside of said main body through said rear wall.

2. An oven in accordance with claim 1 wherein said at least one radiant heat source comprises at least one of a bake element, a broil element, and a convection heating element.

3. An oven in accordance with claim 1 wherein said at least one radiant heat source comprises at least one of a halogen cooking lamp, a ceramic heater, a sheath heater, a calrod, and a ribbon element.

4. An oven in accordance with claim 1 further comprising a waveguide member extending between said RF generation module and said cooking cavity, said waveguide member fabricated from a stainless steel material.

5. An oven in accordance with claim 1 wherein said door is hingedly coupled to said main body, said inner surface of said door extending along said opening, said door configured to withstand a self clean oven temperature.

6. An oven in accordance with claim 5 further comprising thermal break slots extending through at least one of said door and said main body proximate said front edge, said thermal break slots facilitate reducing thermal transfer through the material surrounding said thermal break slots.

7. An oven in accordance with claim 5 wherein said door comprises a multi-pane window pack comprising at least three window panes.

8. An oven in accordance with claim 5 wherein said second air flow channel is configured to channel cooling air flow through an interior of said door.

9. An oven in accordance with claim 1 wherein air flows through said choke and is directed along said inner surface of said door when said venting system is operated in the active mode.

10. An oven in accordance with claim 1 wherein said venting system comprises a vent in flow communication with said cooking cavity and configured to channel air from said cooking cavity, said venting system further comprising a fan coupled to said vent and configured to force air flow through said venting system, said fan operable in an ON mode and an OFF mode depending on a mode of operation of said venting system.

11. An oven in accordance with claim 1 wherein air is drawn through said choke and is directed along said inner surface of said door when said venting system is operated in the active mode.

12. An oven in accordance with claim 1 further comprising a cooling circuit comprising a cooling cavity extending around said cooking cavity, an inlet in flow communication with said cooling cavity, and an outlet in flow communication with said cooling cavity, a portion of said cooling airflow from said cooling cavity is configured to be channeled into said cooking cavity.

13. An oven in accordance with claim 12 wherein the portion of said cooling airflow channeled into said cooking cavity forms an air boundary layer on said inner surface of said door.

14. An oven in accordance with claim 12 wherein said cooling circuit further comprises a fan for directing airflow through said cooling circuit.

15. An oven in accordance with claim 1 wherein said oven is configured to operate on a 120 Volt, 15 Amp circuit.

16. The oven in accordance with claim 1 wherein the door comprises a glass panel mounted therein, an inner surface of the glass panel in communication with an interior of the cooking cavity, and wherein the air outlet of the third air channel directs air along the inner surface of the glass panel and into the cooking cavity.

17. The oven in accordance with claim 1 wherein the air inlet is adjacent to the gasket.

18. An over the range oven comprising:

a main body comprising a top wall, a bottom wall, a rear wall, and a pair of opposing sidewalls;

a frame surrounding the main body and defining a first air flow channel between the frame and main body;

the main body defining a cooking cavity, the cooking cavity further comprising a front edge surrounding an opening opposite said rear wall;

a door coupled to said main body opposite said rear wall, said door having an inner surface in communication with said cooking cavity when said door is in a closed position, said door defining a second air flow channel in communication with said first air flow channel with said door in the closed position;

a venting system positioned proximate said rear wall and between said cooking cavity and an exterior environment, said venting system including a vent inlet disposed in the top wall of the main body, said venting system being configured to exhaust air from said cooking cavity outside of said main body through said rear wall;

a radio frequency (RF) generation module configured to deliver microwave energy into said cooking cavity;

at least one radiant heat source in communication with said cooking cavity and configured to supply heat energy to said cooking cavity;

a choke assembly in air flow communication with said cooking cavity, said choke assembly defining a third air flow channel configured to channel air through said choke assembly and direct the air along said inner surface of the door into said cooking cavity; and a temperature sensor positioned in said sensor cavity, said temperature sensor monitoring a temperature within said cooking cavity.

19. A method of assembling an over the range oven, said method comprising:

providing a main body comprising a top wall, a bottom wall, a rear wall and a pair of opposing sidewalls;

providing a frame surrounding the main body, the frame and the main body defining a first air flow channel;

the main body defining a cooking cavity therein;

coupling a radio frequency (RF) generation module to the cooking cavity, the RF generation module configured to deliver microwave energy into the cooking cavity;

coupling a radiant heat source within the cooking cavity, the radiant heat source configured to supply heat energy to the cooking cavity;

coupling a door to the main body opposite the rear wall such that a second air flow channel defined by the door is in communication with the first air flow channel with the door in a closed position, the door having an inner surface in communication with the cooking cavity when the door is in the closed position;

operatively coupling a controller to the RF generation module and the radiant heat source, the controller configured to operate the RF generation module and the radiant heat source in a radiant heat mode of operation, a microwave mode of operation, a dual mode of operation, and a self clean mode of operation;

coupling a choke assembly between the door and the main body, the choke assembly including a microwave choke and a gasket, an air inlet and an air outlet of the microwave choke defining a third air flow channel configured to channel airflow through the microwave choke and from the air outlet along the inner surface of the door and into the cooking cavity; and positioning a venting system proximate the rear wall and between the cooking cavity and an exterior environment, the venting system configured to operate in an active mode when the RF generation module is activated and operate in a passive mode when the RF generation module is deactivated, in the active mode the venting system providing flow communication between the cooking cavity and the third airflow channel, the venting system further configured to exhaust air from the cooking cavity outside of the main body through the rear wall.

20. A method in accordance with claim 19 further comprising coupling the venting system to the cooking cavity, wherein the venting system includes a vent in flow communication with the cooking cavity and configured to remove vapors from the cooking cavity, a fan coupled to the vent and configured to force air flow through the venting system.

21. A method in accordance with claim 19 further comprising:

providing a cooling cavity adjacent the cooking cavity; and coupling a fan within the cooling cavity for drawing air through the cooling cavity.

22. The method according to claim 19 further comprising providing a glass panel in the door, an inner surface of the glass panel in communication with an interior of the cooking cavity, and wherein the air outlet of the third air channel directs air along the inner surface of the glass panel and into the cooking cavity.

* * * * *